United States Patent
Langzam et al.

(10) Patent No.: US 12,471,868 B2
(45) Date of Patent: Nov. 18, 2025

(54) MEASUREMENT OF BLOOD FLOW PARAMETERS

(71) Applicant: KONINKLIJKE PHILIPS N.V., Eindhoven (NL)

(72) Inventors: Eran Langzam, Haifa (IL); Hannes Nickisch, Hamburg (DE); Christian Haase, Hamburg (IN); Michael Grass, Buchholz In der Nordheide (DE); Holger Schmitt, Luetjensee (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 18/841,752

(22) PCT Filed: Feb. 22, 2023

(86) PCT No.: PCT/EP2023/054449
§ 371 (c)(1),
(2) Date: Aug. 27, 2024

(87) PCT Pub. No.: WO2023/165876
PCT Pub. Date: Sep. 7, 2023

(65) Prior Publication Data
US 2025/0160779 A1   May 22, 2025

(30) Foreign Application Priority Data
Mar. 2, 2022  (EP) ..................................... 22159721

(51) Int. Cl.
*A61B 6/50*     (2024.01)
*A61B 6/00*     (2024.01)
(Continued)

(52) U.S. Cl.
CPC .............. *A61B 6/507* (2013.01); *A61B 6/032* (2013.01); *A61B 6/4241* (2013.01); *A61B 6/481* (2013.01);
(Continued)

(58) Field of Classification Search
CPC ............................... A61B 6/481; A61B 6/482
See application file for complete search history.

(56) References Cited

U.S. PATENT DOCUMENTS 7,218,702 B2 * 5/2007 Mistretta ................ A61B 6/025
378/98.12
7,313,216 B2 * 12/2007 Nishide ................ G06T 11/005
378/4
(Continued)

FOREIGN PATENT DOCUMENTS

| JP | 2009142518 A | 7/2009 |
|---|---|---|
| WO | WO2007034359 A2 | 3/2007 |
| WO | WO2016001017 A1 | 1/2016 |

OTHER PUBLICATIONS

PCT International Search Report, International application No. PCT/EP2023/054449, May 4, 2023.
(Continued)

*Primary Examiner* — Colin T. Sakamoto
(74) *Attorney, Agent, or Firm* — Larry Liberchuk

(57) ABSTRACT

A computer-implemented method of measuring a blood flow parameter in a vasculature, is provided. The method includes: analyzing spectral CT projection data to isolate from the spectral CT projection data, contrast agent projection data representing the flow of the injected contrast agent; sampling the contrast agent projection data at one or more regions of interest in the vasculature to provide temporal blood flow data at the one or more regions of interest; and calculating, from the temporal blood flow data, a value of
(Continued)

one or more blood flow parameters at the one or more regions of interest.

14 Claims, 4 Drawing Sheets

(51) Int. Cl.
*A61B 6/03* (2006.01)
*A61B 6/42* (2024.01)

(52) U.S. Cl.
CPC .............. *A61B 6/482* (2013.01); *A61B 6/504* (2013.01); *A61B 6/503* (2013.01)

(56) References Cited

U.S. PATENT DOCUMENTS

| | | | |
|---|---|---|---|
| 7,492,934 B2 | 2/2009 | Mundy | |
| 9,597,042 B2* | 3/2017 | Proksa | A61B 6/482 |
| 9,867,584 B2 | 1/2018 | Grass | |
| 10,034,614 B2* | 7/2018 | Edic | A61B 6/507 |
| 12,226,245 B2 | 2/2025 | Erhard | |
| 2004/0101088 A1* | 5/2004 | Sabol | A61B 6/481 |
| | | | 378/4 |
| 2008/0304728 A1* | 12/2008 | Licato | G06T 7/20 |
| | | | 382/131 |
| 2011/0274333 A1 | 11/2011 | Prevrhal | |
| 2012/0014500 A1* | 1/2012 | Flohr | A61B 6/507 |
| | | | 378/10 |
| 2012/0237104 A1 | 9/2012 | Fuoras | |
| 2013/0172734 A1* | 7/2013 | Hsieh | A61B 5/0275 |
| | | | 600/431 |
| 2014/0003688 A1* | 1/2014 | Hansis | A61B 6/032 |
| | | | 382/130 |
| 2016/0029987 A1* | 2/2016 | Langan | A61B 6/032 |
| | | | 378/8 |
| 2016/0267704 A1* | 9/2016 | Mistretta | G06T 7/248 |
| 2017/0039734 A1* | 2/2017 | Langan | A61B 6/025 |
| 2017/0105694 A1 | 4/2017 | Grass | |
| 2017/0245816 A1* | 8/2017 | Flohr | A61B 6/481 |
| 2017/0325769 A1* | 11/2017 | Venugopal | A61B 6/486 |
| 2017/0325770 A1* | 11/2017 | Edic | A61B 6/503 |
| 2018/0085078 A1* | 3/2018 | Sankaran | A61B 6/504 |
| 2018/0220984 A1 | 8/2018 | Brauner | |
| 2020/0337668 A1* | 10/2020 | Grass | A61B 6/4233 |

OTHER PUBLICATIONS

Prevrhal S. et al., "CT Angiographic Measurement of Vascular Blood Flow Velocity by Using Projection Data", Radiology, vol. 261, No. 3, pp. 923-929, Dec. 2011.

Barfett J.J. et al., "Intra-Vascular Blood Velocity and Volumetric Flow Rate Calculated from Dynamic 4D CT Angiography Using a Time-of-Flight Technique", International Journal of Cardiovascular Imaging, vol. 30, pp. 1383-1392, 2014.

Brendel B. et al., "Empirical, Projection-Based Basis-Component Decomposition Method", Medical Imaging 2009, Physics of Medical Imaging, edited by Ehsan Samei and Jiang Hsieh, Proc. of SPIE vol. 7258, 72583Y.

Roessl E. et al., "K-Edge Imaging in X-Ray Computed Tomography Using Multi-Bin Photon Counting Detectors", Physics in Medicine and Biology, vol. 52, No. 15, pp. 4679-4696, Aug. 2007.

Silva A.C. et al., "Dual-Energy (Spectral) CT: Applications in Abdominal Imaging", RadioGraphics, vol. 31, No. 4, pp. 1031-1046, 2011.

Nickish H. et al., "Learning Patient-Specific Lumped Models for Interactive Coronary Blood Flow Simulations", MICCAI, Part II, LNCS 9350, pp. 433-441, 2015.

\* cited by examiner

MEASUREMENT OF BLOOD FLOW PARAMETERS

TECHNICAL FIELD

The present disclosure relates to the measurement of blood flow parameters in a vasculature. A computer-implemented method, a computer program product, and a system, are disclosed.

BACKGROUND

Various clinical investigations involve performing an assessment of blood flow in the vasculature. For example, investigations for coronary artery diseases "CAD" often perform an assessment of blood flow. In this regard, various blood flow parameters have been investigated, including the Fractional Flow Reserve "FFR", the instantaneous wave-free ratio "iFR", the Coronary Flow Reserve "CFR", the Thrombolysis in Myocardial Infarction "TIMI" flow grade, the Index of Microvascular Resistance "IMR", and the Hyperemic Microvascular Resistance index "HMR".

Such blood flow parameters have historically been measured using invasive devices such as a pressure-wire. However, more recently, angiographic measurements have been used. By way of an example, the Fractional Flow Reserve "FFR" is often determined in order to assess the impact of a stenosis on delivery of oxygen to the heart muscle in a CAD assessment. The FFR is defined by the ratio $P_d/P_a$, wherein $P_d$ represents a distal pressure at a distal position with respect to the stenosis, and $P_a$ represents a proximal pressure with respect to the stenosis. Historically, values for these pressures have been determined by positioning an invasive device, such as a pressure wire, at the respective positions in the vasculature. However, more recently, angiographic techniques for determining the FFR have been developed. According to fluid flow theory, pressure changes are linked to changes in fluid velocity. In the example of the FFR, angiographic images of an injected contrast agent may be analyzed in order to determine the blood flow velocity. The FFR may then be calculated by using a haemodynamic model to estimate pressure values in the vessel from the blood flow velocity. Thus, the FFR, as well as other blood flow parameters may be determined angiographically.

A known angiographic technique for measuring blood flow velocity is to sample the intensity of an injected contrast agent in computed tomography "CT" image data over time, and to apply a mathematical model to the sampled data. In this regard, a technique for sampling reconstructed CT images in order to determine blood flow velocity is disclosed in a document by Barfett, J. J., et al., "Intravascular blood velocity and volumetric flow rate calculated from dynamic 4D CT angiography using a time of flight technique", Int J Cardiovasc Imaging, 2014, 30:1383-1392. A technique for sampling raw, i.e. "projection" CT data in order to determine blood flow velocity is disclosed in a document by Prevrhal, S. et al., "CT Angiographic Measurement of Vascular Blood Flow Velocity by Using Projection Data", Radiology, Vol. 261: Number 3—December 2011, pages 923-929.

A document WO 2016/001017 A1 relates to an apparatus for determining a fractional flow reserve "FFR" value of the coronary artery system of a living being. A fractional flow reserve value determination unit determines the FFR value by using an FFR value determination algorithm that is adapted to determine the FFR value based on a boundary condition and a provided representation of the coronary artery system, wherein the boundary condition is specific for the living being and determined by a boundary condition determination unit. Since the boundary condition determination unit determines a boundary condition, which is specific for the living being, and since the fractional flow reserve value determination unit not only uses the provided representation of the coronary artery system, but also the living being specific boundary condition for determining the FFR value, the accuracy of the FFR value, which is non-invasively determined, can be improved.

However, there remains room to improve the accuracy of angiographic measurements of blood flow parameters such as blood velocity, pressure, the FFR, the iFR, the CFR, the TIMI flow grade, the IMR, and the HMR.

SUMMARY

According to one aspect of the present disclosure, a computer-implemented method of measuring a blood flow parameter in a vasculature, is provided. The method includes:
- receiving spectral computed tomography, CT, projection data representing a flow of an injected contrast agent in the vasculature, the spectral CT projection data representing X-ray attenuation within the vasculature at a plurality of energy intervals;
- analyzing the spectral CT projection data to isolate from the spectral CT projection data, contrast agent projection data representing the flow of the injected contrast agent;
- sampling the contrast agent projection data at one or more regions of interest in the vasculature to provide temporal blood flow data at the one or more regions of interest; and
- calculating, from the temporal blood flow data, a value of one or more blood flow parameters at the one or more regions of interest.

In the above method, since the contrast agent projection data is isolated by analyzing spectral CT projection data, improved isolation is provided between attenuation arising from the contrast agent, and attenuation arising from background materials such as fat, water, soft tissue, bone, and metals that may also be present in the vicinity of the vasculature. Moreover, since the analyzing and the sampling are performed on projection data, as opposed to e.g. reconstructing the spectral CT projection data and sampling reconstructed contrast agent projection data, potential inaccuracies that may be introduced by reconstructing the spectral CT projection data, are avoided. Thus, the method provides more reliable blood flow data, which, in turn, results in a more accurate calculation of the blood flow parameter(s).

Further aspects, features, and advantages of the present disclosure will become apparent from the following description of examples, which is made with reference to the accompanying drawings.

DETAILED DESCRIPTION

Figure 1:
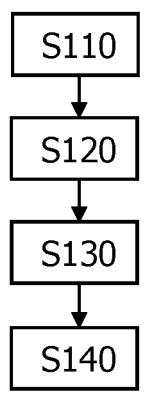
FIG. 1 is a flowchart illustrating an example of a computer-implemented method of measuring a blood flow parameter in a vasculature, in accordance with some aspects of the present disclosure.

Examples of the present disclosure are provided with reference to the following description and figures. In this description, for the purposes of explanation, numerous specific details of certain examples are set forth. Reference in the specification to "an example", "an implementation" or similar language means that a feature, structure, or characteristic described in connection with the example is included in at least that one example. It is also to be appreciated that features described in relation to one example may also be used in another example, and that all features are not necessarily duplicated in each example for the sake of brevity. For instance, features described in relation to a computer implemented method, may be implemented in a computer program product, and in a system, in a corresponding manner.

In the following description, reference is made to a method of measuring a blood flow parameter at one or more regions of interest in a vasculature. In some examples, the vasculature is the coronary vasculature, and the region(s) of interest are coronary vessels. In some examples, the vessel is a coronary artery. However, it is to be appreciated that the vessel may alternatively be a coronary vein. More generally, the method may be used to measure a blood flow parameter in the vasculature in another part of the body than the heart. For example, the region(s) of interest may alternatively be a vessel, i.e., a vein or an artery, that is located in the leg, the arm, the brain, and so forth.

Reference is also made herein to examples in which the measured blood flow parameter is a velocity, or a pressure, or an FFR value for a vessel. However, it is to be appreciated that these serve only as examples, and that the system and method disclosed herein may alternatively be used to measure other blood flow parameters, such as, and without limitation, an iFR value, a CFR value, a TIMI flow grade, an IMR value, and an HMR value, a volumetric blood flow value, a hyperemic stenosis resistance "HSR" value, a zero flow pressure "ZFP" value, and an instantaneous hyperemic diastolic velocity-pressure slope "IHDVPS" value.

It is noted that the computer-implemented methods disclosed herein may be provided as a non-transitory computer-readable storage medium including computer-readable instructions stored thereon, which, when executed by at least one processor, cause the at least one processor to perform the method. In other words, the computer-implemented methods may be implemented in a computer program product. The computer program product can be provided by dedicated hardware, or hardware capable of running the software in association with appropriate software. When provided by a processor, the functions of the method features can be provided by a single dedicated processor, or by a single shared processor, or by a plurality of individual processors, some of which can be shared. The functions of one or more of the method features may for instance be provided by processors that are shared within a networked processing architecture such as a client/server architecture, a peer-to-peer architecture, the Internet, or the Cloud.

The explicit use of the terms "processor" or "controller" should not be interpreted as exclusively referring to hardware capable of running software, and can implicitly include, but is not limited to, digital signal processor "DSP" hardware, read only memory "ROM" for storing software, random access memory "RAM", a non-volatile storage device, and the like. Furthermore, examples of the present disclosure can take the form of a computer program product accessible from a computer-usable storage medium, or a computer-readable storage medium, the computer program product providing program code for use by or in connection with a computer or any instruction execution system. For the purposes of this description, a computer-usable storage medium or a computer readable storage medium can be any apparatus that can comprise, store, communicate, propagate, or transport a program for use by or in connection with an instruction execution system, apparatus, or device. The medium can be an electronic, magnetic, optical, electromagnetic, infrared, or a semiconductor system or device or propagation medium. Examples of computer-readable media include semiconductor or solid state memories, magnetic tape, removable computer disks, random access memory "RAM", read-only memory "ROM", rigid magnetic disks and optical disks. Current examples of optical disks include compact disk-read only memory "CD-ROM", compact disk-read/write "CD-R/W", Blu-Ray™ and DVD.

As mentioned above, there remains room to improve the accuracy of angiographic measurements of blood flow parameters such as blood velocity, pressure, the FFR, the iFR, the CFR, the TIMI flow grade, the IMR, and the HMR.

Figure 2:
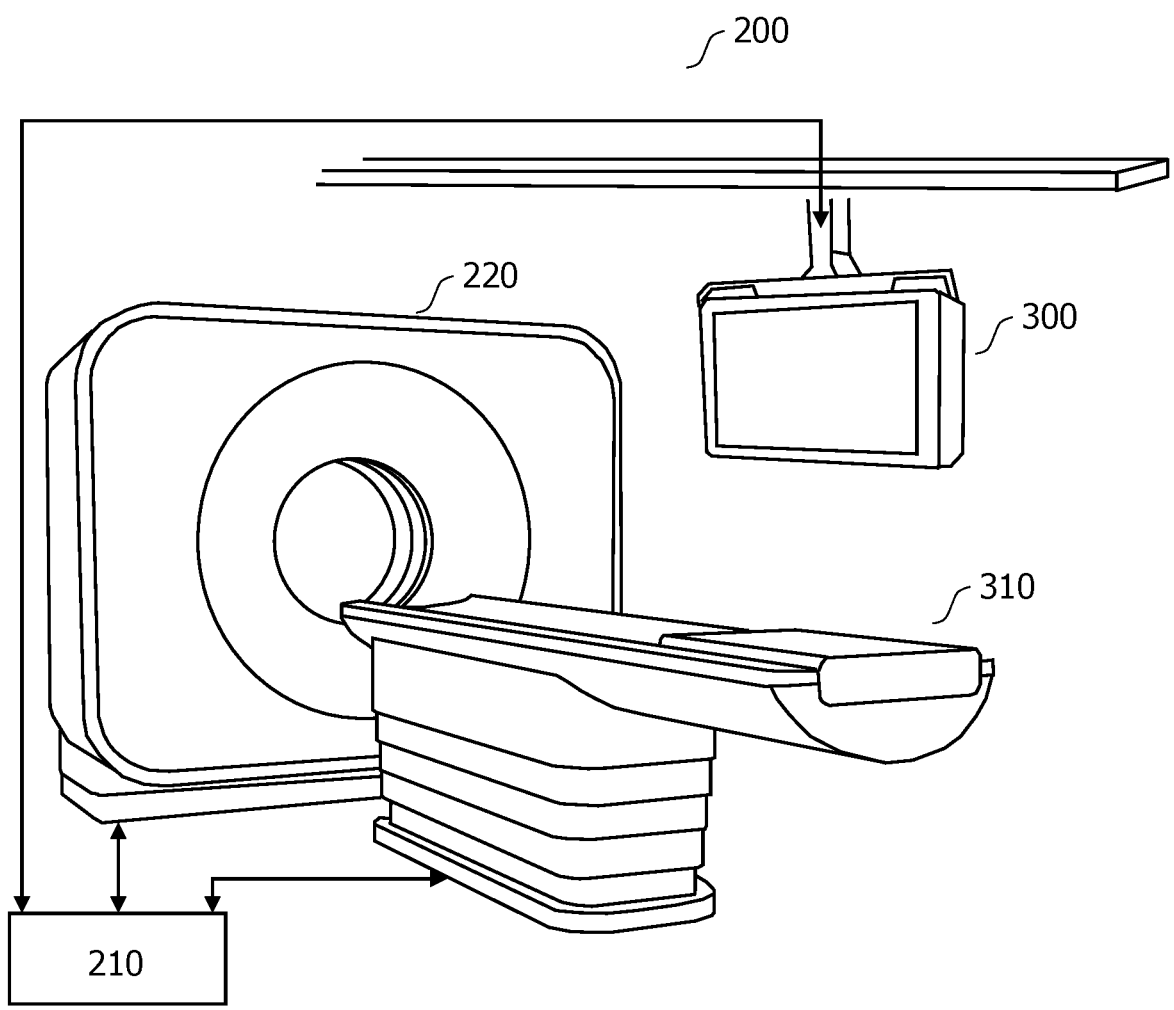
FIG. 2 is a schematic diagram illustrating an example of a system 200 for measuring a blood flow parameter in a vasculature, in accordance with some aspects of the present disclosure.

FIG. 1 is a flowchart illustrating an example of a computer-implemented method of measuring a blood flow parameter in a vasculature, in accordance with some aspects of the present disclosure. FIG. 2 is a schematic diagram illustrating an example of a system 200 for measuring a blood flow parameter in a vasculature, in accordance with some aspects of the present disclosure. Operations described in relation to the method illustrated in FIG. 1, may also be performed in the system 200 illustrated in FIG. 2, and vice versa. With reference to FIG. 1, the computer-implemented method of measuring a blood flow parameter in a vasculature, includes:

receiving S110 spectral computed tomography, CT, projection data 110a, 110b, representing a flow of an injected contrast agent in the vasculature, the spectral CT projection data representing X-ray attenuation within the vasculature at a plurality of energy intervals $DE_{1 \ldots m}$;

analyzing S120 the spectral CT projection data to isolate from the spectral CT projection data, contrast agent projection data representing the flow of the injected contrast agent;

sampling S130 the contrast agent projection data at one or more regions of interest $120_{1 \ldots n}$ in the vasculature to provide temporal blood flow data at the one or more regions of interest; and calculating S140, from the temporal blood flow data, a value of one or more blood flow parameters at the one or more regions of interest $120_{1...n}$.

In the above method, since the contrast agent projection data is isolated by analyzing spectral CT projection data, improved isolation is provided between attenuation arising from the contrast agent, and attenuation arising from background materials such as fat, water, soft tissue, bone, and metals that may also be present in the vicinity of the vasculature. Moreover, since the analyzing and the sampling are performed on projection data, as opposed to e.g. reconstructing the spectral CT projection data and sampling reconstructed contrast agent projection data, potential inaccuracies that may be introduced by reconstructing the spectral CT projection data, are avoided. Thus, the method provides more reliable blood flow data, which, in turn, results in a more accurate calculation of the blood flow parameter(s).

Figure 3:
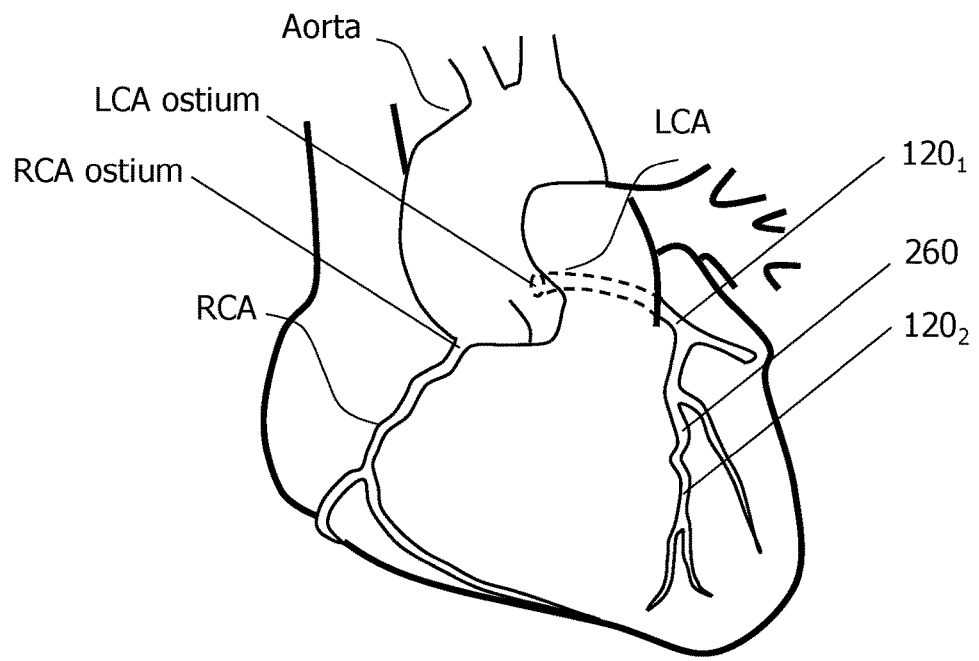
FIG. 3 is a schematic diagram illustrating a heart, including an example of a vessel 260, in accordance with some aspects of the present disclosure.

The above method is also described with reference to FIG. 3, which is a schematic diagram illustrating a heart, including an example of a vessel 260, in accordance with some aspects of the present disclosure. The heart illustrated in FIG. 3 is labelled with the left coronary artery, LCA, the right coronary artery, RCA, and the LCA ostium and RCA ostium that respectively define the openings of these arteries in the aorta. By way of an example, the operations described above with reference to FIG. 1 may be performed in order to measure a blood flow parameter in the cardiac vasculature. For example, the blood flow parameter may be measured in a region of interest such as a proximal position $120_1$, or a distal position $120_2$ within the left coronary artery, LCA, i.e. the vessel 260 illustrated in FIG. 3.

Returning to FIG. 1, in the operation S110, spectral CT projection data 110a, 110b, is received. The spectral CT projection data represents a flow of an injected contrast agent in the vasculature. The spectral CT projection data may also be referred-to as raw spectral CT data. The spectral CT projection data may be received by the one or more processors 210 illustrated in FIG. 2. The spectral CT projection data may be received via any form of data communication, including wired, optical, and wireless communication. By way of some examples, when wired or optical communication is used, the communication may take place via signals transmitted on an electrical or optical cable, and when wireless communication is used, the communication may for example be via RF or optical signals. In general, the one or more processors 210 may receive the spectral CT projection data 110a, 110b, from a spectral X-ray imaging system, or from another source, such as a computer readable storage medium, the Internet, or the Cloud, for example.

With continued reference to FIG. 1, the spectral CT projection data 110a, 110b, that is received in the operation S110 represents a flow of an injected contrast agent in the vasculature. In this regard, the spectral CT projection data may be generated subsequent to the injection of a contrast agent into the vasculature. The contrast agent may include a substance such as iodine, or a Lanthanide such as gadolinium, or indeed another substance that provides visibility of a flow in the vasculature into which the contrast agent is injected.

With continued reference to FIG. 1, the spectral CT projection data 110a, 110b, that is received in the operation S110 may in general be generated by a spectral X-ray imaging system, i.e. a spectral CT imaging system, or a spectral X-ray projection imaging system.

A spectral CT imaging system generates spectral CT projection data whilst rotating, or stepping, an X-ray source-detector arrangement around an imaging region. Examples of spectral CT imaging systems include cone beam spectral CT imaging systems, photon counting spectral CT imaging systems, dark-field spectral CT imaging systems, and phase contrast spectral CT imaging systems. By way of an example, the spectral CT projection data 110a, 110b, may be generated by the Spectral CT 7500 that is marketed by Philips Healthcare, Best, The Netherlands.

Figure 4:
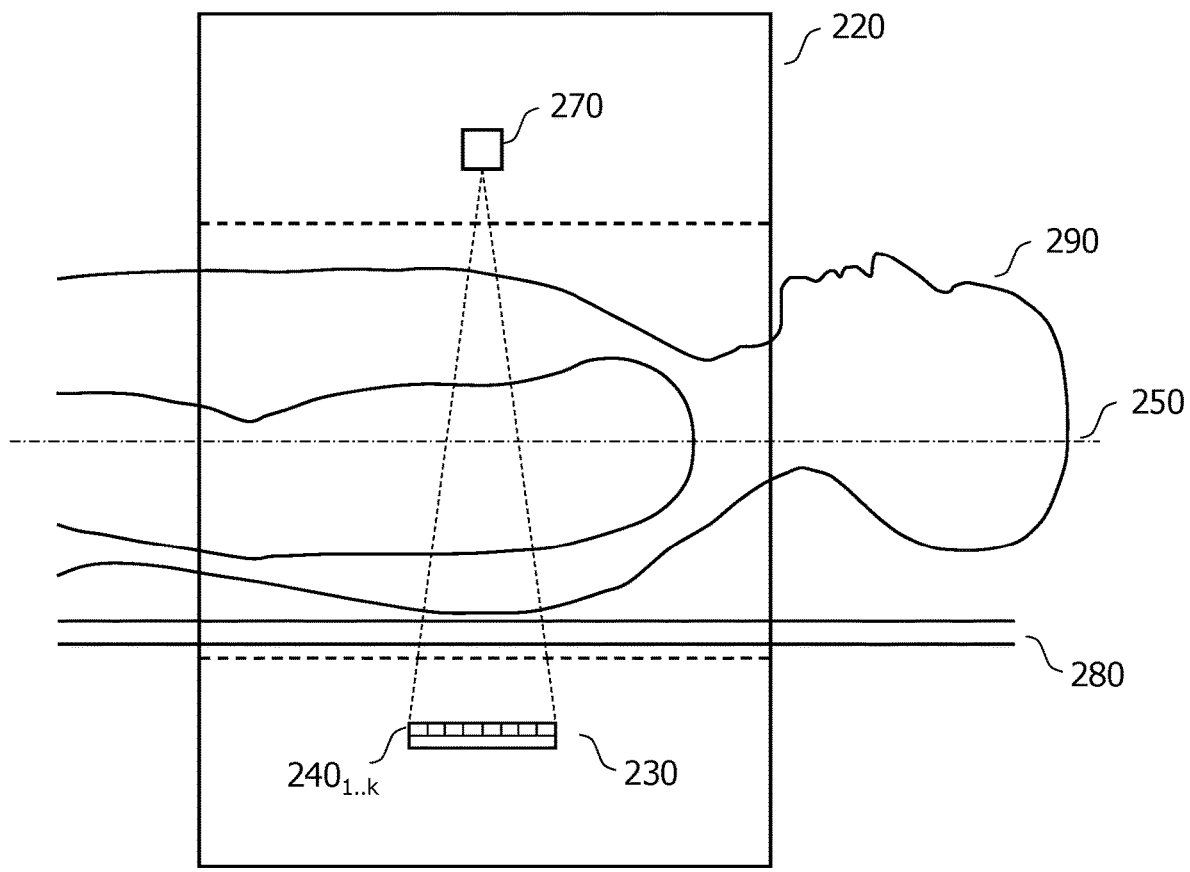
FIG. 4 is a schematic diagram illustrating an example of a spectral CT imaging system 220 including an X-ray detector 230, in accordance with some aspects of the present disclosure.

An example of a spectral CT imaging system 220 that may be used to generate the spectral CT projection data that is received in the operation S110, is illustrated in FIG. 2. Another example of such a spectral CT imaging system 220 is illustrated in FIG. 4. FIG. 4 is a schematic diagram illustrating an example of a spectral CT imaging system 220 including an X-ray detector 230, in accordance with some aspects of the present disclosure. The spectral CT imaging system 220 illustrated in FIG. 4 includes an X-ray source 270 and the X-ray detector 230. The X-ray source 270 and X-ray detector 230 are mechanically coupled to a gantry (not illustrated in FIG. 4). In operation, the X-ray source 270 and X-ray detector 230 are rotated by means of the gantry around an axis of rotation 250 whilst acquiring spectral CT projection data representing X-ray attenuation within a portion of an object, such as subject 290. The spectral CT projection data obtained from multiple rotational angles around the axis of rotation may be subsequently reconstructed into a volumetric image. As illustrated in FIG. 4, the X-ray detector 230 may include a plurality of detector elements $240_{1...k}$ arranged along an axis of rotation 250 of the X-ray detector. The detector elements $240_{1...k}$ may for example be arranged parallel to, or at an acute angle with respect to the axis of rotation. This arrangement allows the X-ray detector 230 to capture projection data that represents a flow of a contrast agent in a direction along the axis of rotation, such as may be occur in some of the vessels in the heart, for instance.

As mentioned above, the spectral CT projection data that is received in the operation S110 may alternatively be generated by a spectral X-ray projection imaging system. Spectral X-ray projection imaging systems typically include a support arm such as a so-called "C-arm" that supports an X-ray source and an X-ray detector. Spectral X-ray projection imaging systems may alternatively include a support arm with a different shape to this example, such as an O-arm, for example. Spectral X-ray projection imaging systems typically generate projection data with the support arm held in a static position with respect to an imaging region during the acquisition of image data. However, spectral X-ray projection imaging systems may also acquire spectral CT projection data whilst rotating their support arm around an axis of rotation. Image reconstruction techniques may then be used to reconstruct this projection data into a volumetric image in a similar manner to a spectral CT imaging system. Thus the spectral CT projection data that is received in the operation S110 may alternatively be generated by a spectral X-ray projection imaging system.

The spectral CT projection data 110a, 110b, that is received in the operation S110 represents X-ray attenuation within the vasculature at a plurality of energy intervals $DE_{1...m}$. In general there may be two or more energy intervals; i.e. m is an integer, and m≥2. The ability to generate X-ray attenuation data at multiple different energy intervals $DE_{1...m}$ distinguishes a spectral X-ray imaging system from a conventional X-ray imaging system. By processing the data from the multiple different energy intervals, a distinction can be made between media that have similar X-ray attenuation values when measured within a single energy interval, and which would be indistinguishable in conventional X-ray image data. In this regard, various different configurations of spectral X-ray imaging systems may be used to generate the spectral CT projection data that is received in the operation S110, some of which are described with reference to FIG. 4.

With reference to FIG. 4, in general, the X-ray source 270 may include multiple monochromatic sources, or one or more polychromatic sources, and the X-ray detector 230 may include: a common detector for detecting multiple different X-ray energy intervals, or multiple detectors wherein each detector detects a different X-ray energy interval $DE_{1\ldots m}$, or a multi-layer detector in which X-rays having energies within different X-ray energy intervals are detected by corresponding layers, or a photon counting detector that bins detected X-ray photons into one of multiple energy intervals based on their individual energies. In a photon counting detector, the relevant energy interval may be determined for each received X-ray photon by detecting the pulse height induced by electron-hole pairs that are generated in response to the X-ray photon's absorption in a direct-conversion material.

Various configurations of the aforementioned X-ray sources 270 and detectors 230 may be used to detect X-rays within different X-ray energy intervals $DE_{1\ldots m}$. In general, discrimination between different X-ray energy intervals may be provided at the source 270 by temporally switching the X-ray tube potential of a single X-ray source 270, i.e. "rapid kVp switching", or by temporally switching, or filtering, the emission of X-rays from multiple X-ray sources. In such configurations, a common X-ray detector may be used to detect X-rays across multiple different energy intervals, attenuation data for each energy interval being generated in a time-sequential manner. Alternatively, discrimination between different X-ray energy intervals may be provided at the detector 230 by using a multi-layer detector, or a photon counting detector. Such detectors can detect X-rays from multiple X-ray energy intervals $DE_{1\ldots m}$ near-simultaneously, and thus there is no need to perform temporal switching at the source 270. Thus, a multi-layer detector, or a photon counting detector, may be used in combination with a polychromatic source to generate X-ray attenuation data at different X-ray energy intervals $DE_{1\ldots m}$.

Other combinations of the aforementioned X-ray sources and detectors may also be used to provide the desired spectral CT projection data for the plurality of energy intervals $DE_{1\ldots m}$. For example, in a yet further configuration, the need to sequentially switch different X-ray sources emitting X-rays at different energy intervals may be obviated by mounting X-ray source-detector pairs to a gantry at rotationally-offset positions around an axis of rotation. In this configuration, each source-detector pair operates independently, and separation between the spectral CT projection data for the different energy intervals $DE_{1\ldots m}$ is facilitated by virtue of the rotational offsets of the source-detector pairs. Improved separation between the spectral CT projection data for the different energy intervals $DE_{1\ldots m}$ may be achieved with this configuration by applying an energy-selective filter to the X-ray detector(s) in order to reduce the effects of X-ray scatter.

Returning to FIG. 1, in the operation S120, the received spectral CT projection data 110a, 110b, is then analyzed in order to isolate from the spectral CT projection data, contrast agent projection data representing the flow of the injected contrast agent. This operation may include identifying as contrast agent projection data, portions of the spectral CT projection data corresponding to a material of the contrast agent, based on an energy-dependent X-ray attenuation signature of the material and/or based on an energy-dependent X-ray attenuation signature of one or more background materials represented in the spectral CT projection data.

The use of various "material decomposition" techniques is contemplated for use in analyzing the spectral CT projection data in the operation S120. The spectral CT projection data represents a flow of an injected contrast agent in the vasculature. The injected contrast agent may include a material such as iodine, or gadolinium. Such materials are often used as contrast agents in view of their attenuation at the X-ray energies used in diagnostic X-ray imaging systems. In addition to the attenuation arising from the contrast agent, the spectral CT projection data may also represent attenuation arising from one or more background materials such as fat, water, bone, soft tissue, vessel calcification, air, and metals such as gold, titanium, tungsten, and platinum. Such materials are often also present in the vicinity of the vasculature, and therefore attenuation arising from these materials may also be represented in the spectral CT projection data. For example, when imaging the cardiac vasculature, bone, in the form of portions of the spine, or ribs are often within the field of view of a spectral CT imaging system. Likewise, fiducial markers, implanted medical devices, and interventional devices are typically formed from metals such as those cited above, and attenuation arising from these materials may also be captured in the spectral CT projection data. By isolating the contrast agent projection data from the spectral CT projection data, more reliable data on the flow of the injected contrast agent is obtained.

One example of a material decomposition technique that may be used in the operation S120 in order to isolate the contrast agent projection data from the spectral CT projection data, is disclosed in a document by Brendel, B. et al., "Empirical, projection-based basis-component decomposition method", Medical Imaging 2009, Physics of Medical Imaging, edited by Ehsan Samei and Jiang Hsieh, Proc. of SPIE Vol. 7258, 72583Y. Another suitable material decomposition technique is disclosed in a document by Roessl, E. and Proksa, R., "K-edge imaging in x-ray computed tomography using multi-bin photon counting detectors", Phys Med Biol. 2007 Aug. 7, 52 (15): 4679-96. Another suitable material decomposition technique is disclosed in the published PCT patent application WO/2007/034359 A2. Another suitable material decomposition technique is disclosed in a document by Silva, A. C., et al., "Dual-energy (spectral) CT: applications in abdominal imaging", RadioGraphics 2011; 31 (4): 1031-1046.

In general, the X-ray attenuation spectrum of a material includes a contribution from Compton Scatter and a contribution from the Photo-electric effect. The attenuation due to Compton scatter is relatively similar for different materials, whereas the attenuation from the Photo-electric effect is strongly material-dependent. Both Compton Scatter and the Photo-electric effect exhibit an energy dependence, and it is this effect that is exploited by material decomposition techniques to analyze spectral CT projection data in order to distinguish between different materials.

In general, material decomposition algorithms operate by decomposing the attenuation spectrum of an absorbing medium into contributions from an assumed set of "basis" materials. The energy-dependent X-ray attenuation of the assumed basis materials is typically modelled as a combination of absorption from Compton Scatter, and the Photo-electric effect. Some materials also have a k-absorption edge "k-edge" energy that is within the energy range used by diagnostic X-ray imaging systems, and this effect may also be exploited in order to distinguish between different materials. The spectral decomposition algorithm then seeks to estimate an amount of each of the basis materials that is required to produce the measured amount of X-ray attenuation at the two or more energy intervals. Water and iodine are examples of basis materials that are often separated in clinical practice using a so-called two-material decomposition algorithm. Non-fat soft tissue, fat, and iodine, are examples of basis materials that are often separated in clinical practice using a three-material decomposition algorithm.

As mentioned above, if the k-absorption edge "k-edge" energy of any of the basis materials is within the energy range used by diagnostic X-ray imaging systems, i.e., approximately 30-120 keV, this can help to identify the contribution of a basis material. The k-edge energy for a material is defined as the minimum energy required for the Photo-electric event to occur with a k-shell electron. The k-edge occurs at a characteristic energy for each material. The k-edge energy for a material is marked by a sharp increase in its X-ray attenuation spectrum at X-ray energies corresponding to the k-edge energy value. The k-edge energies of many materials that are present in the human body are too low to be detected in a diagnostic X-ray imaging system. For example, the k-edge energies of hydrogen, carbon, oxygen, and nitrogen are at energies that are less than 1 keV. However, materials such as iodine (k-edge=33.2 keV), gadolinium (50.2 keV), gold (80.7 keV), platinum (78.4 keV), tantalum (67.4 keV), holmium (55.6 keV), and molybdenum (k-edge=20.0 keV) have k-edge energy values that permit their distinction in spectral CT projection data acquired from diagnostic X-ray imaging systems.

Figure 5:
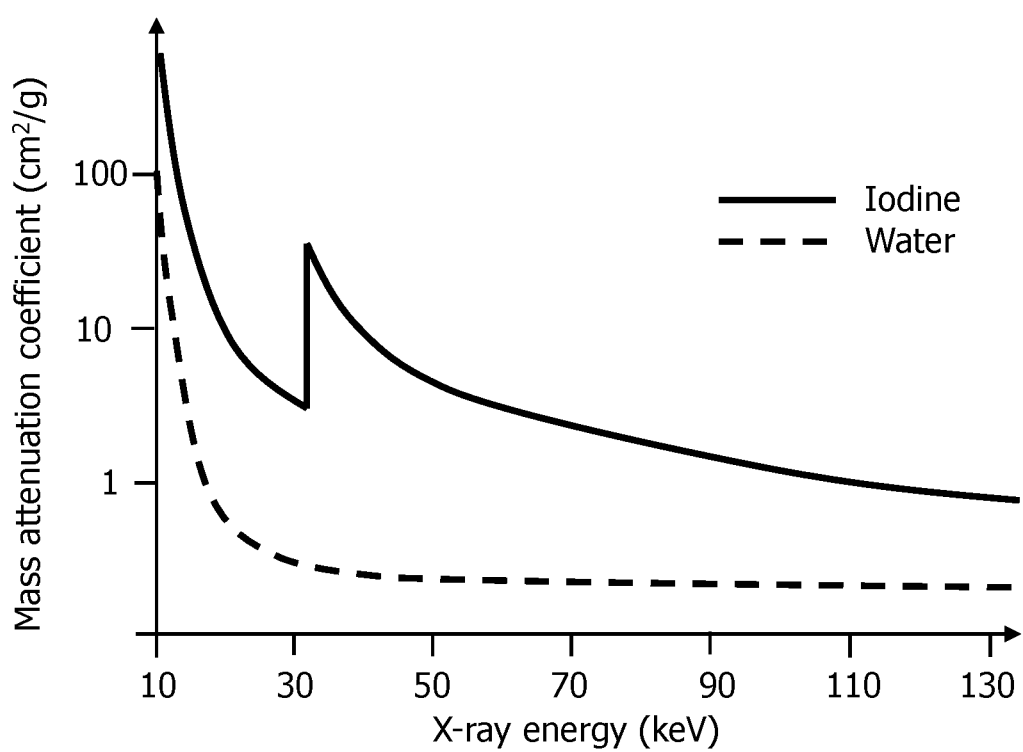
FIG. 5 is a graph illustrating the dependence of the mass attenuation coefficient with X-ray energy for two example materials, iodine and water.

As mentioned above, materials such as iodine and gadolinium may be present in the vasculature as an injected contrast agent, and materials such as gold, platinum, tantalum, holmium, and molybdenum may be present in the vicinity of the vasculature body as fiducial markers, implanted medical devices, and interventional devices. Thus, the k-edge energies of such materials may be used to identify their presence in the spectral CT projection data $110a$, $110b$. By way of an example, FIG. 5 is a graph illustrating the dependence of the mass attenuation coefficient with X-ray energy for two example materials, iodine and water. The mass attenuation coefficient represented in FIG. 5 represents the X-ray attenuation. The sharp increase in X-ray attenuation for iodine at 33.2 keV facilitates a separation between the contributions of each of these materials to a combined attenuation spectrum. In this example, iodine and water may be separated by locating one energy interval $DE_1$ close to the k-edge energy of 33.2 keV, and another energy interval $DE_2$ significantly above the k-edge energy.

Consequently, by using such material decomposition techniques, the contrast agent projection data representing the flow of the injected contrast agent, may be isolated from the spectral CT projection data.

Returning to FIG. 1, in the operation S130 the contrast agent projection data is then sampled at one or more regions of interest $120_{1 \ldots n}$ in the vasculature to provide temporal blood flow data at the one or more regions of interest. It is noted that the analyzing S120 and sampling S130 operations are both performed on spectral CT projection data, i.e. on raw data. Performing the sampling operation S130 on projection data as opposed to on reconstructed data has the advantages of improved accuracy and simplified workflow because it obviates the inaccuracies and complexity introduced by operations such as image reconstruction and vessel segmentation. These operations can be error-prone, and also complex, particularly when the vasculature is affected by motion.

A technique for performing the sampling operation S130 on CT projection data, and which may be used in the operation S130 to provide temporal blood flow data at the region(s) of interest, is disclosed in the document by Prevrhal, S. et al., cited above. This document discloses a technique in which flow velocity can be measured from row-to-row multidetector CT projection data obtained during a single gantry revolution as a bolus of contrast material flows through a vascular phantom. In accordance with the present disclosure, the principles that are known from this document for CT projection data, are applied to the contrast agent projection data that was isolated from the spectral CT projection data in the operation S120. In particular, this document discloses a technique in which a flow velocity is determined for a contrast agent trace that is represented in projection, or "Radon" space. In this document, projection data representing the contrast agent trace is generated using an imaging arrangement in which rows of X-ray detector elements arranged transversely with respect to the contrast agent flow direction. The flow velocity is determined based on the time at which a center of the contrast agent trace is detected in successive detector rows. In accordance with the present disclosure, a similar projection-space analysis may be made on the contrast agent projection data that was obtained in the operation S120, by sampling this data over time at the region(s) of interest.

Figures 6A, 6B:
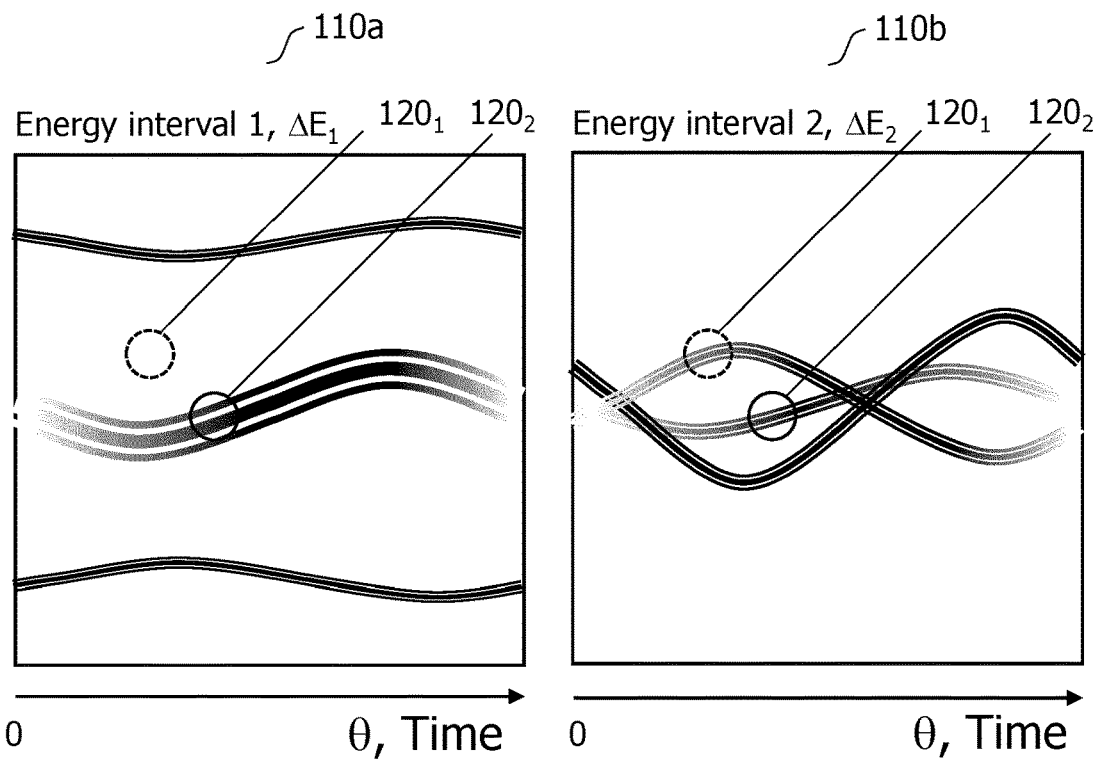
FIG. 6 is an example of a sinogram including spectral CT projection data representing a) X-ray attenuation within a first energy interval $DE_1$, and b) X-ray attenuation within a second energy interval $DE_2$, in accordance with some aspects of the present disclosure.

A technique for sampling S130 the contrast agent projection data at one or more regions of interest in spectral CT projection data is now described with reference to FIG. 6. FIG. 6 is an example of a sinogram including spectral CT projection data representing a) X-ray attenuation within a first energy interval $DE_1$, and b) X-ray attenuation within a second energy interval $DE_2$, in accordance with some aspects of the present disclosure. The sinograms illustrated in FIG. 6 represent the spectral CT projection data that is acquired during the rotation of a gantry of a spectral CT imaging system around a vasculature. The rotational angle q in FIG. 6a and FIG. 6b, therefore also represents time. The projection data is illustrated in FIG. 6a for a first energy interval $DE_1$, and which may represent a range of X-ray energies at a relatively lower energy portion of the X-ray spectrum, and in FIG. 6b for a second energy interval $DE_2$, which may represent a range of X-ray energies at a relatively higher energy portion of the X-ray spectrum. As may be observed in FIG. 6a and in FIG. 6b, the intensity of the projection data in each of the two illustrated energy intervals changes over time. The changes in intensity represent changes in the amount of contrast agent in the vasculature over time. The period of time represented in FIG. 6 includes a so-called inflow phase, when contrast agent enters a region of interest, and a so-called wash-out phase, when the contrast agent leaves the region of interest. In the example illustrated in FIG. 6, the spectral CT projection data represents X-ray attenuation at two energy intervals. Such data may be referred-to as "dual-energy" data. It is noted that the spectral CT projection data may alternatively represent X-ray attenuation at more than two energy intervals.

The spectral CT projection data $110a$, $110b$ illustrated in FIG. 6a and FIG. 6b, may be analyzed in the operation S120 using one of the material decomposition techniques mentioned above. The result of the operation S120 is to provide contrast agent projection data representing the flow of the injected contrast agent. The isolated contrast agent projection data is not illustrated in FIG. 6, but may similarly be represented in the form of a sinogram. In the operation S130, the contrast agent projection data is then sampled over time at one or more regions of interest $120_{1 \ldots n}$ in the vasculature in order to provide temporal blood flow data at one or more regions of interest. As mentioned above, by sampling the contrast agent projection data, as opposed to e.g. sampling reconstructed image data, more reliable blood flow data may be provided.

In general, the region(s) of interest represent positions in a vasculature at which it is desired to determine temporal blood flow data. The regions of interest $120_{1,2}$ may for instance represent a proximal position and a distal position in a coronary artery from which it is desired to calculate a blood flow parameter such as the FFR. Performing the sampling operation S130 on the regions of interest in projection data, also requires the region(s) of interest to be defined in the projection data. In this regard, the region(s) of interest may be defined directly in the projection data, or alternatively they may be defined in the projection data indirectly via a reconstructed image. In the first situation, the region(s) of interest may be defined directly in the spectral CT projection data, or directly in the isolated contrast agent projection data. Landmarks may be identified in this data, and then used to identify the region(s) of interest in the projection data. The second situation is described later below. In the first situation, the landmarks may represent features of the vasculature, such as a bifurcation, or bony regions such as ribs or a portion of the spine. Such landmarks give rise to a characteristic pattern in the projection data, e.g. in the sinograms illustrated in FIGS. 6a and 6b, that may be used to determine the position of the region(s) of interest in the vasculature in the sinogram. For example, a bifurcation in the vasculature may give rise to characteristic pattern of two phase-shifted waves that enables a determination of a region of interest in the vasculature. Any metal landmarks would appear in the sinogram as a pronounced sine wave, and may be identified in the projection data by applying a threshold to the intensity values in the sinogram. Thus, in the first situation, the method described with reference to FIG. 2 may also include:

identifying one or more anatomical landmarks in the spectral CT projection data; and identifying a location of the one or more regions of interest $120_{1 \ldots n}$ in the spectral CT projection data based on the identified one or more anatomical landmarks.

Figure 7:
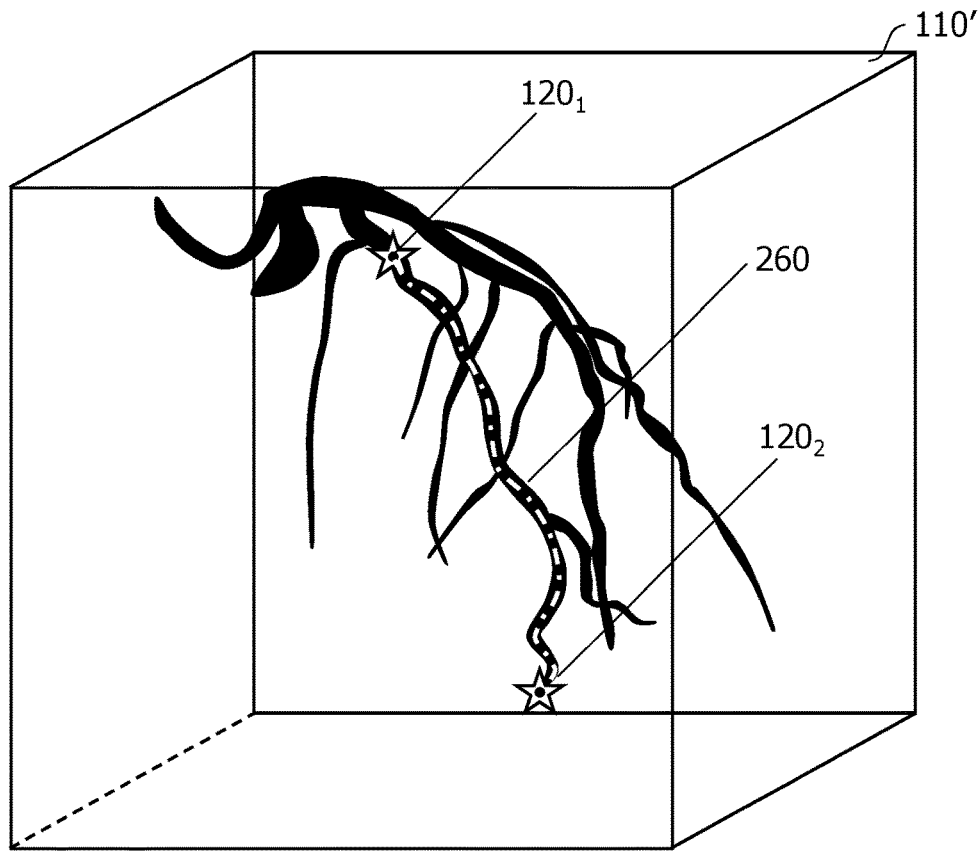
FIG. 7 is an example of a reconstructed image 110' obtained from spectral CT projection data, in accordance with some aspects of the present disclosure.

As mentioned above, in a second situation, the sampling operation S130 is performed on projection data, and the region(s) of interest are defined in the projection data indirectly via a reconstructed image. In this second situation, the spectral CT projection data 110a, 110b illustrated in FIG. 6a and FIG. 6b, or alternatively, the isolated contrast agent projection data that is obtained from the operation S120, is reconstructed into one or more reconstructed images representing the vasculature. This image may then be used to identify the region(s) of interest, the locations of which are then mapped back to the projection data. By way of an example, FIG. 7 is an example of a reconstructed image 110' obtained from spectral CT projection data, in accordance with some aspects of the present disclosure. The reconstructed image 110' illustrated in FIG. 7 may be obtained by reconstructing the projection data illustrated in FIG. 6a and FIG. 6b. The reconstruction of either the spectral CT projection data, or the isolated contrast agent projection data, provides a volumetric image of the vasculature, that may be used to assist in identifying the regions of interest $120_1, 120_2$ in the projection data. Various known image reconstruction techniques may be used to reconstruct the projection data. Reconstructing the isolated contrast agent projection data that is obtained from the operation S120 provides a reconstructed image that represents only the vasculature, and in which materials other than the contrast agent material, are omitted. Thus, if attenuation from bone regions is represented in the spectral CT projection data, the attenuation from bone would be omitted from the reconstructed image 110'. The absence of such features may provide a clearer view of the vasculature. By contrast, a reconstruction of the spectral CT projection data 110a, 110b that is received in the operation S110, provides a more complete image of the anatomical landmarks surrounding the vasculature. Such additional landmarks may also facilitate the identification of the regions of interest.

Thus, in some examples, the method further comprises:

reconstructing the spectral CT projection data, or the contrast agent projection data into one or more reconstructed images representing the vasculature;

identifying a location of the one or more regions of interest $120_1, 120_2$ in the one or more reconstructed images;

mapping the location of the one or more regions of interest $120_1, 120_2$ to the spectral CT projection data, or to the contrast agent projection data, respectively; and wherein the sampling S130 is performed on the contrast agent projection data at locations corresponding to the one or more mapped regions of interest.

In this second situation in which the region(s) of interest are defined in the projection data indirectly via a reconstructed image, a location of the one or more regions of interest $120_1, 120_2$, may be identified manually, or automatically, in the reconstructed image(s) 110'. A manual identification of the regions of interest $120_1, 120_2$ may be performed by means of a user operating a user input device in combination with the displayed reconstructed image(s) 110'. An automatic identification of the regions of interest $120_1, 120_2$ may be performed using a feature detector, or a trained neural network. If the spectral CT projection data is reconstructed, a segmentation may also be performed on the reconstructed image in order to assist in identifying the regions of interest. Thus, the one or more reconstructed images may also be segmented; and the operation of identifying a location of the one or more regions of interest $120_1, 120_2$ in the one or more reconstructed images, may be performed in the one or more segmented reconstructed images. Various segmentation algorithms are known for this purpose.

As mentioned above, a feature detector, or a trained neural network may be used to automatically identify the region(s) of interest in the reconstructed image(s). The region(s) of interest may be a vessel, or a stenosis in a vessel. The neural network, or feature detector may automatically identify a potential position for measuring a blood flow parameter in the reconstructed image. By way of an example, the reconstructed image 110' illustrated in FIG. 7 represents a portion of the cardiac vasculature, and includes the left coronary artery 260. A feature detector, or a trained neural network may identify the left coronary artery, and also a narrowing therein, and indicate the regions of interest $120_1, 120_2$, respectively as a potential proximal position, and a potential distal position, for use in making blood flow velocity measurement. The blood flow velocity measurements may subsequently be used to determine an FFR value for the stenosis.

In this second situation, after having identified a location of the one or more regions of interest $120_1$, $120_2$, in the reconstructed image(s), the location of the region(s) of interest $120_1$, $120_2$ is then mapped back to the spectral CT projection data, or to the contrast agent projection data. This operation may be performed using the known spatial correspondence between the positions in the reconstructed image (s), and the projection data from which the image(s) was reconstructed. Subsequently, the sampling operation S130 described above is performed on the contrast agent projection data, at locations corresponding to the one or more mapped regions of interest, in order to provide temporal blood flow data at one or more regions of interest.

Returning to FIG. 1, in the operation S140, the value of one or more blood flow parameters at the one or more regions of interest $120_{1 \ldots n}$ is then calculated from the temporal blood flow data. This operation may include, for example, a calculation of a blood flow velocity at the region(s) of interest. This operation may be performed in accordance with the document by Prevrhal, S., et al., cited above. Other blood flow parameters than the blood flow velocity may also be determined, alternatively or additionally, in the operation S140. For example, one or more of the following may be calculated for a vessel 260 in the vasculature in the operation S140: a pressure, a transit time, a fractional flow reserve, FFR, value, an instantaneous wave-free ratio, iFR, value, a coronary flow reserve, CFR, value, a thrombolysis in myocardial infarction, TIMI, flow grade value, an index of microvascular Resistance, IMR, value, and a hyperemic microvascular resistance index, HMR, value. These examples are described in more detail below.

A pressure at a region of interest in a vessel may in general be determined using a haemodynamic model that uses as input parameters the blood velocity, and dimensions of the vasculature. An example of such a model is disclosed in a document by Nickisch et al., "Learning Patient-Specific Lumped Models for Interactive Coronary Blood Flow Simulations", MICCAI, 2015. The dimensions of a vessel that are used in the model may be determined from the projection data, for example by analyzing the contrast agent projection data, or alternatively from measurements of the reconstructed spectral CT projection data at the region(s) of interest $120_{1 \ldots n}$.

A transit time, $T_T$, is defined as the time taken for an injected front of a contrast agent to travel between a proximal position in a vessel to a distal position in the vessel. The proximal and distal positions are defined with respect to the ostium of the relevant vessel, and may be defined as regions of interest $120_1$, $120_2$, respectively. The transit time may be calculated using the blood flow velocity, which is determined as described above, and also using a calculated distance between the regions of interest, which may be determined in the spectral CT projection data, or in a reconstructed image.

In one example, the vasculature comprises a vessel 260, and the operation of calculating S140 a value of one or more blood flow parameters at the one or more regions of interest $120_{1 \ldots n}$ comprises:
  calculating a proximal blood velocity and a distal blood velocity at respective proximal $120_1$ and distal $120_1$ positions in the vessel 260;
  calculating, using a haemodynamic model, a proximal blood pressure $P_a$ and a distal blood pressure $P_d$ at the respective proximal and distal positions in the vessel; and
  calculating one or more of the following from the proximal blood pressure $P_a$ and the distal blood pressure $P_d$:

a fractional flow reserve, FFR, value, an instantaneous wave-free ratio, iFR, value.

In this example, a further input to the haemodynamic model, may include geometric measurements of the vessel that are obtained from the projection data, or from a reconstructed image representing the vessel. The FFR is defined by the Equation:

$$FFR = P_d/P_a \qquad \text{Equation 1}$$

wherein $P_d$ represents a distal pressure at a distal position in a vessel and $P_a$ represents a proximal pressure at a proximal position in a vessel. The haemodynamic model may be used to calculate the pressure values $P_d$ and $P_a$ using the geometric measurements of the vessel. When measured for a stenosis, the distal position may be distal to the stenosis. An example of a haemodynamic model that may be used in this example is disclosed in the document by Nickisch et al., cited above.

The IFR may be calculated using the same Equation as the FFR. The IFR differs from that FFR in that the FFR is measured during the wave-free period during diastole. This wave-free period may be determined for a vasculature based on a received electrocardiogram signal, for example.

The Coronary flow reserve "CFR" is defined as the ratio between coronary blood flow at maximal hyperaemia and at baseline condition. The CFR expresses the capacity of the coronary circulation to respond to a physiological increase in oxygen demands with a corresponding increase in blood flow. The CFR may be determined from the velocity at a region of interest using the Equation:

$$CFR = APV_h/APV_b \qquad \text{Equation 2}$$

wherein $APV_h$ is the average peak velocity, measured in centimeters per second, during maximal hyperaemia, and $APV_b$ is the average peak velocity, measured in centimeters per second, under a baseline condition.

The IMR may be calculated form the transit time $T_T$ described above, and is defined by the Equation:

$$IMR = P_d \cdot T_T \qquad \text{Equation 3}$$

wherein $P_d$ represents the distal pressure at the distal position in the vessel. The IMR is typically calculated using the time-averaged value of the distal pressure $P_d$ over a cardiac cycle at maximal hyperemia.

If a vessel is subject to severe epicardial stenosis, an alternative definition for the IMR has been proposed, and wherein the IMR is computed using the Equation:

$$IMR = P_d \cdot T_T \cdot \left(\frac{P_d - P_w}{P_a - P_w}\right) \qquad \text{Equation 4}$$

In Equation 4, the additional term $P_a$ represents the proximal pressure at the proximal position in the vessel, and the additional term $P_w$ represents the coronary wedge pressure, i.e. the pressure at a distal position to the stenosis when the vessel is occluded by an inflated balloon. The IMR is typically calculated with Equation 4 using the time-averaged value of the proximal pressure $P_a$ over a cardiac cycle at maximal hyperemia, using the time-averaged value of the distal pressure $P_d$ over a cardiac cycle at maximal hyperemia, and using the time-averaged value of the pressure over a cardiac cycle at the distal position $Pos_d$ in the vessel when the vessel is occluded by an inflated balloon the wedge pressure $P_w$. Alternative equations for computing the IMR may also be used, and these likewise depend on the transit time $T_T$.

The HMR is typically calculated using the Equation:

$$HMR = P_d/V_d \qquad \text{Equation 5}$$

wherein $P_d$ represents the distal pressure at the distal position in the vessel, and $V_d$ represents the blood flow velocity at the distal position in the vessel. The parameter $V_d$ may be determined as described above.

One or more further operations may be performed in the computer-implemented method described above with reference to FIG. 1.

In one example, a volumetric image is reconstructed from data other than the spectral CT projection data that is received in the operation S110. The reconstructed volumetric image is then used to identify the region(s) of interest that are sampled in the operation S120. In this example, the method also includes:

receiving volumetric image data representing the one or more regions of interest $120_{1...n}$;

reconstructing the received volumetric image data to provide a reconstructed image representing the one or more regions of interest $120_{1...n}$;

identifying the one or more regions of interest $120_1$, $120_2$ in the reconstructed image; and mapping a position of the one or more regions of interest $120_{1...n}$ from the reconstructed image into the spectral CT projection data to provide the one or more regions of interest in the spectral CT projection data.

Various advantages are associated with identifying the region(s) of interest in an image that is reconstructed from the volumetric image data, i.e. data that is separate to the spectral CT projection data that is received in the operation S110. For example, the volumetric image data may be acquired prior to the spectral CT projection data, enabling its use as a planning image with which to plan the measurement of the blood flow parameters using the subsequently-acquired spectral CT projection data. The volumetric image data may be acquired some months, weeks, days, or a shorter period of time before the spectral CT projection data. Alternatively, the volumetric image data may be acquired in time later than the spectral CT projection data, and used in a subsequent analysis of the spectral CT projection data. The use of various types of volumetric image data is also contemplated. For instance, the volumetric image data may be CT projection data, spectral CT projection data, ultrasound data, and so forth. The use of a different type of data to the spectral CT projection data may reduce the amount of X-ray dose applied to a subject, or provide a reconstructed image with a different resolution, or provide a reconstructed image in which different features, such as soft tissue, are more clearly visible.

In this example, the volumetric image data may be reconstructed using known image reconstruction techniques. The region(s) of interest may be identified in the reconstructed image manually, or automatically, and in a similar manner to that described above for the reconstruction of an image from the spectral CT projection data. The operation of mapping a position of the region(s) of interest $120_{1...n}$ into the spectral CT projection data may be performed by registering the two datasets. For example, if a reconstructed image is generated from the spectral CT projection data, an image registration may be performed, and used to map the regions of interest. The regions of interest may alternatively be mapped by registering the reconstructed image from the volumetric data, to the spectral CT projection data. This operation may be performed based the identification and matching of corresponding landmarks, or fiducial markers, in both images. Mapping the regions of interest to the spectral CT projection data permits an accurate identification of the landmarks in the reconstructed image from the volumetric image data, and the calculation of the blood flow parameters using only spectral CT projection data. This has the advantage of obviating inaccuracies in e.g. reconstructing, and segmenting, the spectral CT projection data, and consequently subjecting the calculation of the blood flow parameters to such inaccuracies.

In another example, the operation of analyzing S120 the spectral CT projection data, is performed selectively at the one or more regions of interest $120_1$, $120_2$. In other words, the analyzing operation S120 is performed only at the region(s) of interest. A region of interest may be a point in the image space represented by the spectral CT projection data, or a larger volume, e.g. a group of voxels. The region of interest may encompass a section of a vessel, for example. By performing the operation S120 only at the region(s) of interest, the blood flow parameters may be obtained with reduced computational load.

In another example, the method described with reference to FIG. 1 is performed using only data representing an "uptake" phase when injected contrast agent flows into the region(s) of interest. In this example, the flow of the injected contrast agent in the vasculature represents an uptake phase during which a front of the injected contrast agent flows into the one or more regions of interest $120_{1...n}$. The flow of the injected contrast agent in the vasculature does not represent a washout phase during which a trailing edge of the injected contrast agent flows out of the one or more regions of interest $120_{1...n}$. Data representing only the uptake phase may be generated by triggering the acquisition of the spectral CT data based on a time of injection of the contrast agent, or by post-acquisition analysis of acquired spectral CT projection data to detect a position of a front of the injected contrast agent. By omitting data from the washout phase, a reduced amount of data is processed in the method. The X-ray dose to a subject may also be reduced if there is no need to image the vasculature during the washout phase.

Alternatively, rather than using only data representing the uptake phase, the method described with reference to FIG. 1 may be performed using only data representing a "washout" phase when injected contrast agent flows out of the region(s) of interest. In this example, the flow of the injected contrast agent in the vasculature represents a washout phase during which a trailing edge of the injected contrast agent flows out of the one or more regions of interest $120_{1...n}$; and the flow of the injected contrast agent in the vasculature does not represent an uptake phase during which a front of the injected contrast agent flows into the one or more regions of interest $120_{1...n}$. Data representing only the washout phase may be generated by triggering the acquisition of the spectral CT data based on a time of injection of the contrast agent, or by post-acquisition analysis of acquired spectral CT projection data to detect a position of a trailing edge of the injected contrast agent. By omitting data from the uptake phase, a reduced amount of data is processed in the method. The X-ray dose to a subject may also be reduced if there is no need to image the vasculature during the uptake phase.

In another example, a computer program product, is provided. The computer program product comprises instructions which when executed by one or more processors, cause the one or more processors to carry out a method of measuring a blood flow parameter in a vasculature. The method comprises:

receiving S110 spectral computed tomography, CT, projection data 110a, 110b representing a flow of an injected contrast agent in the vasculature, the spectral CT projection data representing X-ray attenuation within the vasculature at a plurality of energy intervals $DE_{1 \ldots m}$;

analyzing S120 the spectral CT projection data to isolate from the spectral CT projection data, contrast agent projection data representing the flow of the injected contrast agent;

sampling S130 the contrast agent projection data at one or more regions of interest $120_{1 \ldots n}$ in the vasculature to provide temporal blood flow data at the one or more regions of interest; and calculating S140, from the temporal blood flow data, a value of one or more blood flow parameters at the one or more regions of interest $120_{1 \ldots n}$.

In another example, a system 200 for measuring a blood flow parameter in a vasculature, is provided. The system includes one or more processors 210 configured to:

receive S110 spectral computed tomography, CT, projection data 110a, 110b representing a flow of an injected contrast agent in the vasculature, the spectral CT projection data representing X-ray attenuation within the vasculature at a plurality of energy intervals $DE_{1 \ldots m}$;

analyze S120 the spectral CT projection data to isolate from the spectral CT projection data, contrast agent projection data representing the flow of the injected contrast agent;

sample S130 the contrast agent projection data at one or more regions of interest $120_{1 \ldots n}$ in the vasculature to provide temporal blood flow data at the one or more regions of interest; and calculate S140, from the temporal blood flow data, a value of one or more blood flow parameters at the one or more regions of interest $120_{1 \ldots n}$.

An example of the system 200 is illustrated in FIG. 2. It is noted that the system 200 may also include one or more of: a spectral X-ray imaging system for generating the spectral CT projection data that is received in the operation S110, such as for example the spectral CT imaging system 220 illustrated in FIG. 2; a monitor 300 for displaying the calculated one or more blood flow parameters, reconstructed images, and so forth; a patient bed 310; an injector (not illustrated in FIG. 2) for injecting a contrast agent into the vasculature; and a user input device configured to receive user input (not illustrated in FIG. 2), such as a keyboard, a mouse, a touchscreen, and so forth.

The above examples are to be understood as illustrative of the present disclosure, and not restrictive. Further examples are also contemplated. For instance, the examples described in relation to computer-implemented methods, may also be provided by the computer program product, or by the computer-readable storage medium, or by the system 200, in a corresponding manner. It is to be understood that a feature described in relation to any one example may be used alone, or in combination with other described features, and may be used in combination with one or more features of another of the examples, or a combination of other examples. Furthermore, equivalents and modifications not described above may also be employed without departing from the scope of the invention, which is defined in the accompanying claims. In the claims, the word "comprising" does not exclude other elements or operations, and the indefinite article "a" or "an" does not exclude a plurality. The mere fact that certain features are recited in mutually different dependent claims does not indicate that a combination of these features cannot be used to advantage. Any reference signs in the claims should not be construed as limiting their scope.

The invention claimed is:

1. A computer-implemented method of measuring a blood flow parameter in a vasculature, the method comprising:
    receiving spectral computed tomography (CT) projection data representing a flow of an injected contrast agent in the vasculature, the spectral CT projection data representing X-ray attenuation within the vasculature at a plurality of energy intervals;
    analyzing the spectral CT projection data to isolate from the spectral CT projection data contrast agent projection data representing the flow of the injected contrast agent;
    sampling the contrast agent projection data at one or more regions of interest in the vasculature to provide temporal blood flow data at the one or more regions of interest; and
    calculating, from the temporal blood flow data, a value of one or more blood flow parameters at the one or more regions of interest.

2. The computer-implemented method according to claim 1, wherein the method further comprises:
    identifying one or more anatomical landmarks in the spectral CT projection data; and
    identifying a location of the one or more regions of interest in the spectral CT projection data based on the identified one or more anatomical landmarks.

3. The computer-implemented method according to claim 2, wherein the identifying one or more anatomical landmarks in the spectral CT projection data comprises identifying one or more characteristic patterns corresponding to the one or more landmarks in a sinogram representation of the spectral CT projection data.

4. The computer-implemented method according to claim 1, further comprising:
    reconstructing the spectral CT projection data or the contrast agent projection data, into one or more reconstructed images representing the vasculature;
    identifying a location of the one or more regions of interest in the one or more reconstructed images;
    mapping the location of the one or more regions of interest to the spectral CT projection data, or to the contrast agent projection data, respectively; and
    wherein the sampling is performed on the contrast agent projection data at locations corresponding to the one or more mapped regions of interest.

5. The computer-implemented method according to claim 4, wherein the method further comprises:
    segmenting the one or more reconstructed images; wherein the identifying a location of the one or more regions of interest in the one or more reconstructed images, is performed in the one or more segmented reconstructed images.

6. The computer-implemented method according to claim 1, wherein the method further comprises:
    receiving volumetric image data representing the one or more regions of interest;

reconstructing the received volumetric image data to provide a reconstructed image representing the one or more regions of interest;
identifying the one or more regions of interest in the reconstructed image; and
mapping a position of the one or more regions of interest from the reconstructed image into the spectral CT projection data to provide the one or more regions of interest in the spectral CT projection data.

7. The computer-implemented method according to claim 1, wherein the analyzing the spectral CT projection data comprises:
Identifying, as contrast agent projection data, portions of the spectral CT projection data corresponding to a material of the contrast agent, based on an energy-dependent X-ray attenuation signature of the material and/or based on an energy-dependent X-ray attenuation signature of one or more background materials represented in the spectral CT projection data.

8. The computer-implemented method according to claim 7, wherein:
the material of the contrast agent comprises iodine and/or gadolinium; and/or
the one or more background materials include one or more of: fat, water, bone, soft tissue, vessel calcification, air, and a metal.

9. The computer-implemented method according to claim 1, wherein the analyzing the spectral CT projection data is performed selectively at the one or more regions of interest.

10. The computer-implemented method according to claim 1, wherein the spectral CT projection data is generated by a spectral X-ray imaging system, comprising an X-ray detector having a plurality of detector elements arranged along an axis of rotation of the X-ray detector, and wherein the spectral CT projection data is acquired whilst rotating the X-ray detector around the axis of rotation.

11. The computer-implemented method according to claim 1, wherein the vasculature comprises a vessel, and wherein the calculating a value of one or more blood flow parameters at the one or more regions of interest comprises calculating one or more of the following blood flow parameters for the vessel; a blood velocity, a pressure, a transit time, a fractional flow reserve (FFR) value, an instantaneous wave-free ratio (iFR) value, a coronary flow reserve (CFR) value, a thrombolysis in myocardial infarction (TIMI) flow grade value, an index of microvascular Resistance (IMR) value, and a hyperemic microvascular resistance index (HMR) value.

12. The computer-implemented method according to claim 1, wherein the vasculature comprises a vessel, and wherein the calculating a value of one or more blood flow parameters at the one or more regions of interest comprises:
calculating a proximal blood velocity and a distal blood velocity at respective proximal and distal positions in the vessel;
calculating, using a haemodynamic model, a proximal blood pressure and a distal blood pressure at the respective proximal and distal positions in the vessel; and
calculating one or more of the following from the proximal blood pressure and the distal blood pressure: a fractional flow reserve (FFR) value, an instantaneous wave-free ratio (iFR) value.

13. The computer-implemented method according to claim 1, wherein:
the flow of the injected contrast agent in the vasculature represents an uptake phase during which a front of the injected contrast agent flows into the one or more regions of interest; and
wherein the flow of the injected contrast agent in the vasculature does not represent a washout phase during which a trailing edge of the injected contrast agent flows out of the one or more regions of interest;
or
wherein the flow of the injected contrast agent in the vasculature represents a washout phase during which a trailing edge of the injected contrast agent flows out of the one or more regions of interest; and
wherein the flow of the injected contrast agent in the vasculature does not represent an uptake phase during which a front of the injected contrast agent flows into the one or more regions of interest.

14. A system for measuring a blood flow parameter in a vasculature, the system comprising one or more processors configured to:
receive spectral computed tomography (CT) projection data representing a flow of an injected contrast agent in the vasculature, the spectral CT projection data representing X-ray attenuation within the vasculature at a plurality of energy intervals;
analyze the spectral CT projection data to isolate from the spectral CT data contrast agent projection data representing the flow of the injected contrast agent;
sample the contrast agent projection data at one or more regions of interest in the vasculature to provide temporal blood flow data at the one or more regions of interest; and
calculate, from the temporal blood flow data, a value of one or more blood flow parameters at the one or more regions of interest.

* * * * *